US009850955B2

United States Patent
Koda

(10) Patent No.: US 9,850,955 B2
(45) Date of Patent: Dec. 26, 2017

(54) OUTER RACE ROTATION BEARING

(71) Applicant: Tsuyoshi Koda, Shizuoka (JP)

(72) Inventor: Tsuyoshi Koda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/402,328

(22) PCT Filed: May 22, 2013

(86) PCT No.: PCT/JP2013/064200
§ 371 (c)(1),
(2) Date: Nov. 20, 2014

(87) PCT Pub. No.: WO2013/176172
PCT Pub. Date: Nov. 28, 2013

(65) Prior Publication Data
US 2015/0152920 A1  Jun. 4, 2015

(30) Foreign Application Priority Data

May 24, 2012 (JP) .................................. 2012-118199

(51) Int. Cl.
*F16C 33/78* (2006.01)
*F16C 33/76* (2006.01)
(Continued)

(52) U.S. Cl.
CPC .......... *F16C 33/7853* (2013.01); *F16C 19/26* (2013.01); *F16C 33/768* (2013.01);
(Continued)

(58) Field of Classification Search
CPC  F16C 33/783; F16C 33/7853; F16C 33/7856; F16C 33/768; F16C 2361/63; F16C 19/06; F16C 19/26; F16J 15/3276
See application file for complete search history.

(56) References Cited

U.S. PATENT DOCUMENTS 3,473,856 A * 10/1969 Helms ................... F16C 33/783
277/375
3,683,475 A   8/1972 Mackas et al.
(Continued)

FOREIGN PATENT DOCUMENTS

JP          6-35663       5/1994
JP          11-2252       1/1999
(Continued)

OTHER PUBLICATIONS

International Search Report dated Jul. 30, 2013 in International (PCT) Application No. PCT/JP2013/064200.
(Continued)

*Primary Examiner* — Alan B Waits
(74) *Attorney, Agent, or Firm* — Wenderoth, Lind & Ponack, L.L.P.

(57) ABSTRACT

In an outer race rotation bearing in which an outer race rotates, a mounting portion is fitted in each annular groove of the outer race. A pair of seals are provided which close the respective axial ends of an annular space defined between a fixed inner race and the outer race. Each of the seals has an elastic lip which protrudes toward the interior of the bearing, and which is kept in close contact with a groove edge portion of the annular groove from the inner peripheral side of the outer race. In this arrangement, when the seals are pressed axially outwardly by grease to which centrifugal force is applied, the grease leakage preventing lips of the respective seals function as lids to close the gaps generated between the mounting portions and the annular grooves, thereby making it possible to prevent grease from leaking through these gaps.

6 Claims, 4 Drawing Sheets

(51) Int. Cl.
  *F16J 15/3276* (2016.01)
  *F16C 19/26* (2006.01)
  *F16C 19/06* (2006.01)
(52) U.S. Cl.
  CPC ........ *F16C 33/783* (2013.01); *F16C 33/7856* (2013.01); *F16J 15/3276* (2013.01); *F16C 19/06* (2013.01); *F16C 2361/63* (2013.01)

(56) References Cited

U.S. PATENT DOCUMENTS

| | | |
|---|---|---|
| 2002/0191877 A1 | 12/2002 | Suzuki et al. |
| 2004/0184690 A1 | 9/2004 | Suzuki et al. |
| 2004/0264824 A1 | 12/2004 | Iwata |
| 2008/0310782 A1 | 12/2008 | Walter |
| 2010/0284642 A1 | 11/2010 | Mineno et al. |

FOREIGN PATENT DOCUMENTS

| | | |
|---|---|---|
| JP | 2001-65582 | 3/2001 |
| JP | 2004-340210 | 12/2004 |
| JP | 2005-299712 | 10/2005 |
| JP | 2009-520935 | 5/2009 |
| JP | 2009-174588 | 8/2009 |
| JP | 2009-281547 | 12/2009 |
| JP | 2011-226576 | 11/2011 |
| JP | 2012-232708 | 11/2012 |

OTHER PUBLICATIONS

Written Opinion of the International Searching Authority dated Jul. 30, 2013 in International (PCT) Application No. PCT/JP2013/064200 (with English translation).

Extended European Search Report dated May 20, 2015 in corresponding European Patent Application No. 13793427.9.

Japanese Office Action dated Dec. 1, 2015 in corresponding Japanese Patent Application No. 2012-118199 (with partial English translation).

* cited by examiner

OUTER RACE ROTATION BEARING

TECHNICAL FIELD

The present invention relates to a bearing in which an outer race rotates at a high speed, and which is used in automobiles, etc. (this type of bearing is hereinafter referred to as an "outer race rotation bearing").

BACKGROUND ART

Generally, an outer race rotation bearing is configured such that an annular space defined between an inner race and an outer race is closed at both axial ends of the annular space by a pair of seals mounted on the respective end portions of the inner peripheral surface of the outer race, a plurality of rolling elements are arranged between the inner race and the outer race, lubricant such as grease is sealed in the annular space by the seals, the inner race is fixed, and the outer race rotates. Conventionally, in order to extend the service life of the bearing, the measure has been taken that the inner diameter of the outer race is enlarged so as to increase the volume of the annular space, thereby increasing the amount of lubricant to be sealed in the annular space.

However, in some cases, such an outer race rotation bearing shortens rather than extends its service life by enlarging the inner diameter of the outer race and thus increasing the amount of lubricant to be sealed in the annular space. The reason is explained below using a ball bearing as an example. As illustrated in FIG. 6(a), generally, a seal 52 mounted on each end portion of an outer race 51 includes an annular mounting portion 53 formed of a rubber, and the mounting portion 53 is fitted in an annular groove 54 formed in the inner peripheral surface of the outer race 51. In this arrangement, if the inner diameter of the outer ring 51 is large, grease G to which centrifugal force is applied strongly presses the seal 52 axially outwardly. As a result thereof, in some cases, as illustrated in FIG. 6(b), the entire seal 52 is slightly moved axially outwardly due to the elastic deformation of the mounting portion 53, thereby causing grease G to leak through the gap generated between the seal mounting portion 53 and the annular groove 54.

Furthermore, if the amount of grease G to be sealed is increased, the stirring resistance of grease G also becomes large and thus the temperature of the bearing rises. As a result thereof, since the rubber of which the seal 53 is formed deteriorates faster than usual, grease G is likely to leak in this respect, too.

As countermeasures against such grease leakage as described above, generally, seal mounting portions are formed of a rubber which is less likely to be deteriorated by heat, and grease which generates little heat is chosen. Also, various proposals are made for preventing the temperature of a bearing from rising. For example, Japanese Unexamined Patent Application Publication No. 2009-174588 discloses that a pulley made of a resin is fitted on an outer race such that both end surfaces of the outer race and both end portions of the outer peripheral surface of the outer race are not covered by the pulley, thereby enabling more heat to be released from the bearing.

However, in particular, in an outer race rotation bearing used under high-speed conditions in which the rotation speed of the bearing nearly reaches its limit, such as a pulley bearing for use in the engine of automobiles, since a large centrifugal force tends to act on grease and also the temperature of the bearing tends to rise, the above-described conventional countermeasures are not sufficient for dealing with such problems, and thus the service life of the bearing tends to be shortened due to grease leakage.

SUMMARY OF THE INVENTION

It is an object of the present invention to prevent grease from leaking from an outer race rotation bearing in which an outer race rotates at a high speed so as to extend the service life of the bearing.

In order to achieve the above object, the present invention provides an outer race rotation bearing comprising: an inner race which is stationary; an outer race which is rotatable; a plurality of rolling elements arranged between the inner race and the outer race, wherein an annular space is defined between the inner race and the outer race; and a pair of seals which close the respective axial ends of the annular space; the seals each including an annular mounting portion formed of an elastic member, and fitted in an annular groove formed in the inner peripheral surface of the outer race; wherein a lubricant is sealed in the annular space; wherein each of the seals is provided with an elastic lip protruding toward the interior of the bearing; and wherein each of the elastic lips is kept in close contact with a groove edge portion of a corresponding one of the annular grooves from the inner peripheral side of the outer race.

Namely, the outer race rotation bearing is configured such that the mounting portions formed of an elastic member are fitted in the respective annular grooves of the outer race, and such that each of the seals, which close the respective axial sides of the annular space defined between the inner race and the outer race, has the elastic lip which protrudes toward the interior of the bearing, and which is kept in close contact with the groove edge portion of the annular groove from the inner peripheral side of the outer race. In this arrangement, when the seals are pressed by grease to which centrifugal force is applied, though the seals may be moved axially outwardly, the elastic lips of the respective seals function as lids to close the gaps generated between the mounting portions and the annular grooves, thereby making it possible to prevent grease from leaking through these gaps.

In the arrangement in which the axially inner groove edge portion of each of the annular grooves has a circular arc-shaped section, it is desirable that the groove edge portions are entirely covered by the elastic lips of the respective seals.

Also, in the arrangement in which each of the seals has a metal core formed integral with the mounting portion, and the metal core is bent into a crank shape in the mounting portion, it is possible that the mounting portions are fitted more firmly in the annular grooves so as to make grease leakage further less likely to occur.

Also, in the arrangement in which the inner walls of the annular grooves of the outer race are knurled, and thus the outer race and the seals do not rotate relative to each other, it is also possible to prevent grease leakage which arises from the wear of the seals.

In the present invention, as described above, each of the seals of the outer race rotation bearing has the elastic lip which protrudes toward the interior of the bearing, and which is kept in close contact with the groove edge portion of the annular groove of the outer race from the inner peripheral side of the outer race. In this arrangement, since the elastic lips of the respective seals function as lids to close the gaps generated between the mounting portions and the annular grooves, it is possible to prevent grease from leaking through these gaps so as to extend the service life of the bearing.

DETAILED DESCRIPTION OF THE INVENTION

Figure 1:
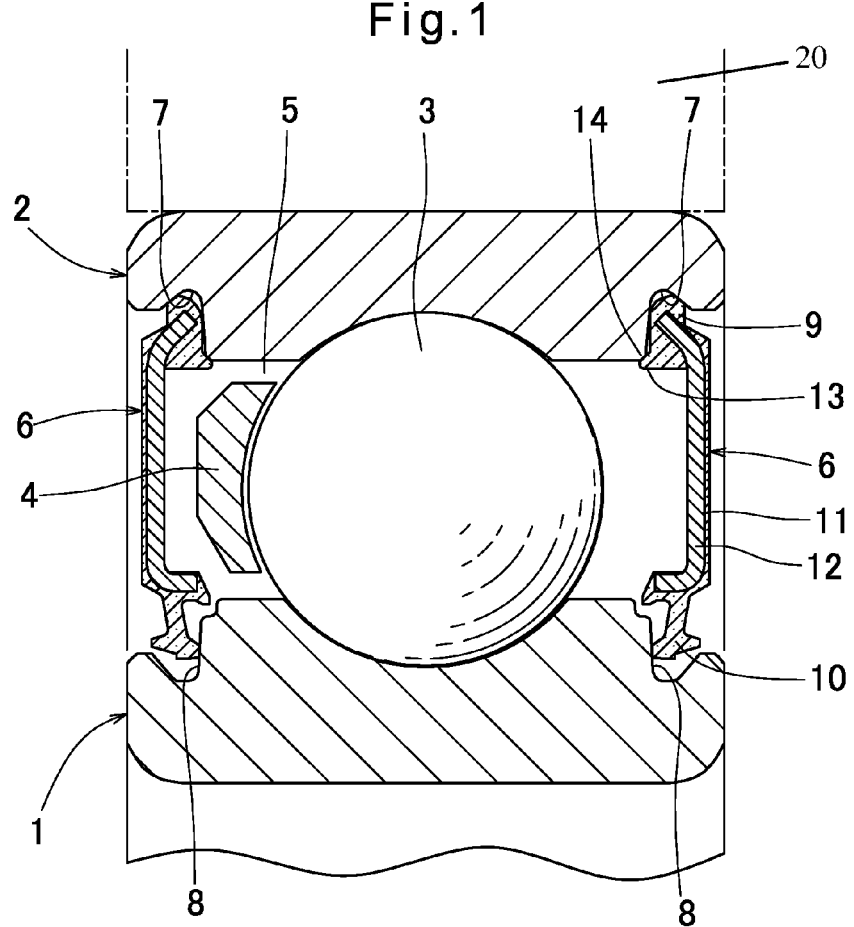
FIG. 1 is a front sectional view of a main portion of an outer race rotation bearing according to an embodiment of the present invention.

An embodiment of the present invention is now described with reference to FIGS. 1 to 5. As illustrated in FIG. 1, this outer race rotation bearing is a ball bearing including a fixed inner race 1, a rotatable outer race 2, a plurality of balls 3 as rolling elements arranged between the inner race 1 and the outer race 2, a retainer 4 which rollably retains the balls 3, and a pair of seals 6 which close the respective axial ends of the annular space 5 defined between the inner race 1 and the outer race 2. Grease (not shown) as a lubricant is sealed in the annular space 5 of the bearing by the seals 6. This bearing is used as an engine pulley bearing for use with an engine pulley 20 in the engine of automobiles. The seals 6 are mounted in annular grooves 7 formed in the respective end portions of the inner peripheral surface of the outer race 2, and are in sliding contact with seal sliding surfaces 8 formed on the respective end portions of the outer peripheral surface of the inner race 1. The inner race 1 may be formed integral with a fixed shaft, not illustrated.

Each of the seals 6 includes a rubber member 11 having at the outer peripheral edge thereof an annular mounting portion 9 fitted in the annular groove 7 of the outer race 2, and having at the inner peripheral edge thereof a seal lip 10 which is in sliding contact with the seal sliding surface 8 of the inner race 1. As shown in the figures, the mounting portion 9 encases the radially outer end of the metal core 12, such that the radially outer end of the metal core 12 is not in contact against the groove surfaces of the annular groove 7 at both axially inner and outer surfaces of the metal core 12. The rubber member 11 is formed integral with a metal core 12 by vulcanization. The outer peripheral portion (protruding portion) of the metal core 12 is bent inwardly of the bearing so as to be oblique to the diametric direction, and the inner peripheral portion of the metal core 12 is bent inwardly of the bearing so as to be perpendicular to the diametric direction. As shown in FIGS. 1-4, the protruding portion of the metal core 12 protrudes radially outwardly beyond the groove edge portion 14 and has a radial length greater than half of the radial distance between the groove edge portion 14 and the bottom of the annular groove 7. The mounting portion 9 of the rubber member 11 has a grease leakage preventing lip (elastic lip) 13 having a substantially triangular section so as to protrude into the interior of the bearing from the inner peripheral portion of the mounting portion 9. The rubber member 11 is made of e.g. nitrile rubber, acrylic rubber, fluororubber, or silicon rubber, which are all less likely to be deteriorated by heat.

Figure 2:
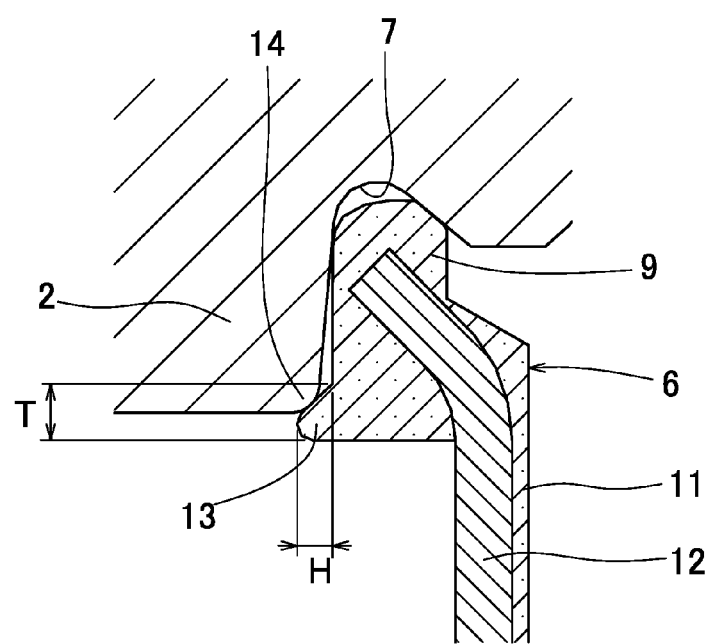
FIG. 2 is an enlarged sectional view of a seal mounting portion of FIG. 1 and the vicinity of the seal mounting portion.
Figure 3:
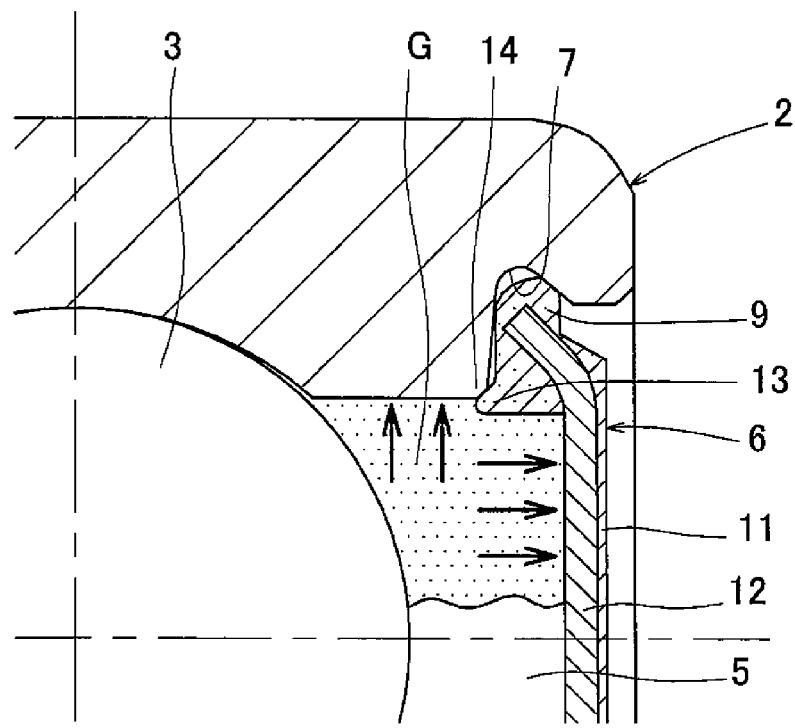
FIG. 3(a) and FIG. 3(b) are enlarged sectional views each illustrating how a seal of the bearing of FIG. 1 functions.
Figure 3:
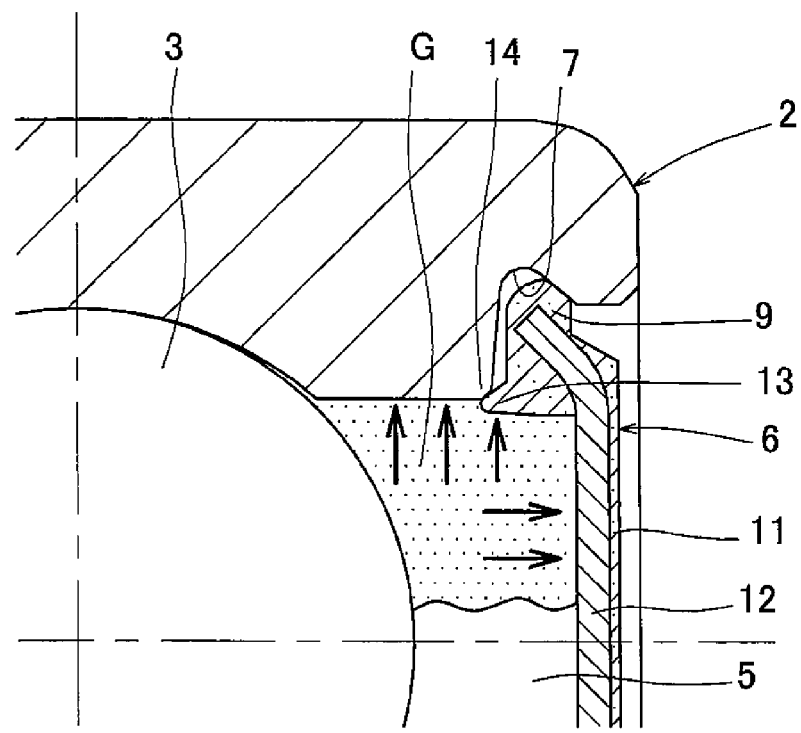

As illustrated in FIG. 2, the axially inner groove edge portion 14 of each of the annular grooves 7 of the outer race 2 has a circular arc-shaped section, and the grease leakage preventing lip 13 of each of the seals 6 covers the whole of this groove edge portion 14, which has a circular arc-shaped section, so as to come into close contact with the groove edge portion 14 from the inner peripheral side of the outer race 2.

As for the grease leakage preventing lip 13 of each of the seals 6, if the thickness T of the lip 13 in the radial direction is too small compared to the height H of the lip 13 (protruding length measured from the mounting portion 9), it is difficult to manufacture such a lip 13. Also, if the thickness T is too large compared to the height H, such a lip 13 is less likely to come into close contact with the groove edge portion 14 due to centrifugal force. Therefore, the grease leakage preventing lip 13 is designed such that the ratio of the thickness T to the height H is not more than 1 and not less than ½.

With this arrangement, as illustrated in FIG. 3(a), when grease G sealed in the annular space 5 receives centrifugal force and thus presses the seals 6 axially outwardly, as illustrated in FIG. 3(b), the seal mounting portion 9 may be elastically deformed and thus the whole of each of the seals 6 may be slightly moved axially outwardly. In this state, however, the grease leakage preventing lips 13 of the respective seals 6 function as lids to close the gaps generated between the seal mounting portions 9 and the annular grooves 7 of the outer race 2. As a result thereof, grease G is less likely to leak through these gaps. This extends the life of the bearing.

Since the rubber members 11 of the seals 6 are made of a rubber which is less likely to be deteriorated by heat, even if the rubber members 11 are used under conditions in which the temperature of the bearing is high, grease leakage is less likely to arise from rubber deterioration, thus enabling the seals 6 to maintain excellent performance for a long period of time.

In the above-described embodiment, for each of the seals 6, the rubber member 11 is formed by vulcanization so as to cover the whole of the outer side surface of the metal core 12. However, the rubber member 11 may be divided into an outer peripheral portion and an inner peripheral portion, and the separate inner and outer portions may be vulcanized so as not to cover a portion of the outer side surface of the metal core 12. Since such an arrangement enables more heat to be released from the bearing, the rubber of the rubber member 11 is further less likely to be deteriorated by heat, thus enabling the seals 6 to maintain excellent performance for a longer period of time.

Figure 4:
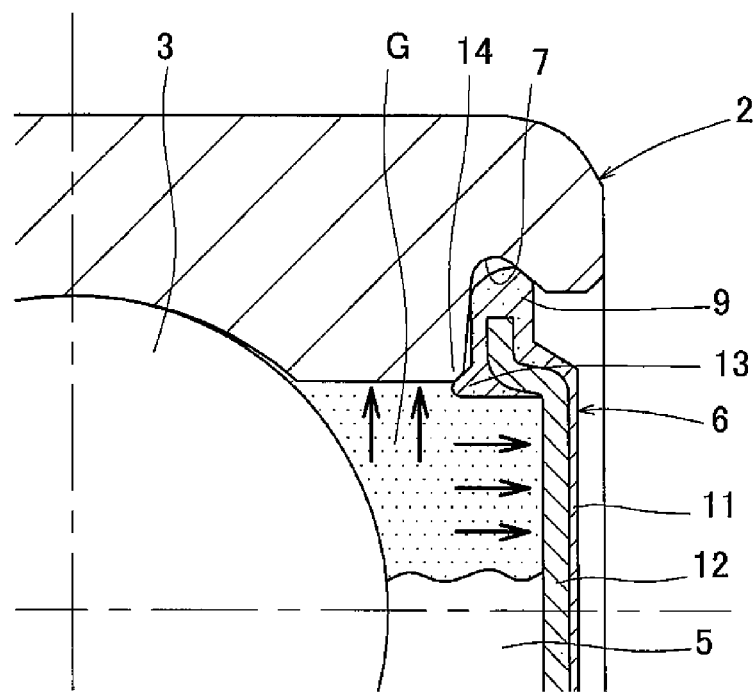
FIG. 4 is an enlarged sectional view illustrating a variation in which a metal core of the seal of FIG. 1 has another shape.

FIG. 4 illustrates a variation in which the metal core 12 of each of the seals 6 has another shape. In this variation, the outer peripheral portion of the metal core 12 which is located inside the seal mounting portion 9 is bent inwardly of the bearing into the shape of a crank (i.e., wherein the metal core 12 includes an axially extending portion having an axially inner edge and an axially outer edge, a portion extending radially outwardly from the axially inner edge, and a portion extending radially inwardly from the axially outer edge, as illustrated in FIG. 4). With this arrangement, since the seal mounting portions 9 are fitted more firmly in the annular grooves 7 of the outer race 2, the entire seals 6 are less likely to be moved axially outwardly. As a result thereof, grease leakage is further less likely to occur than in the examples of FIGS. 1 to 3.

Figure 5:
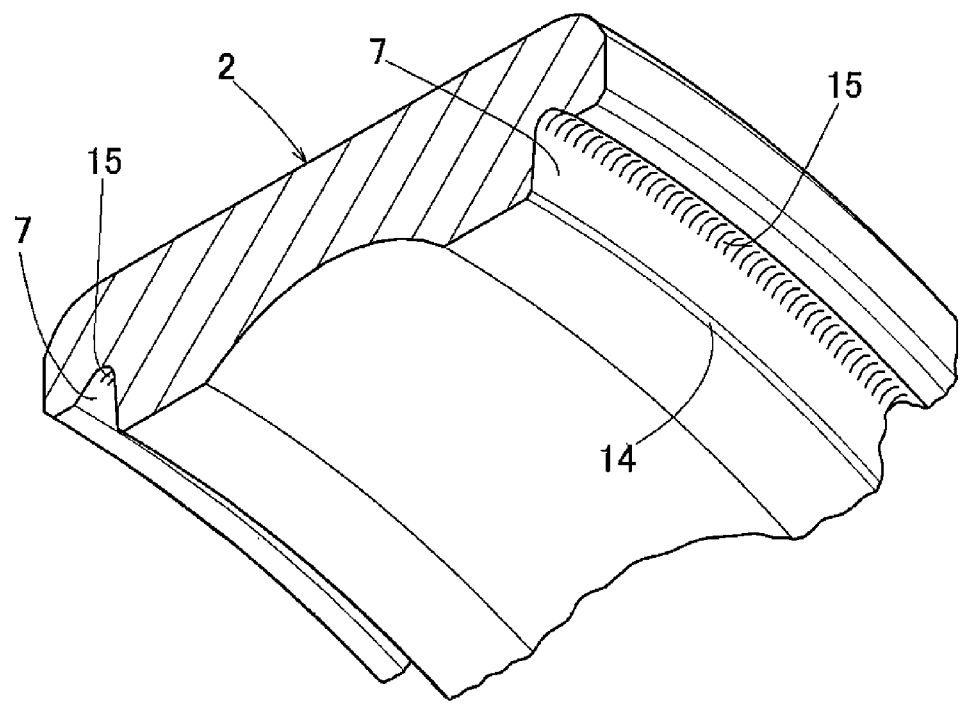
FIG. 5 is a perspective view of a main portion illustrating an example in which annular grooves of an outer race of FIG. 1 are processed to be knurled.
Figure 6A:
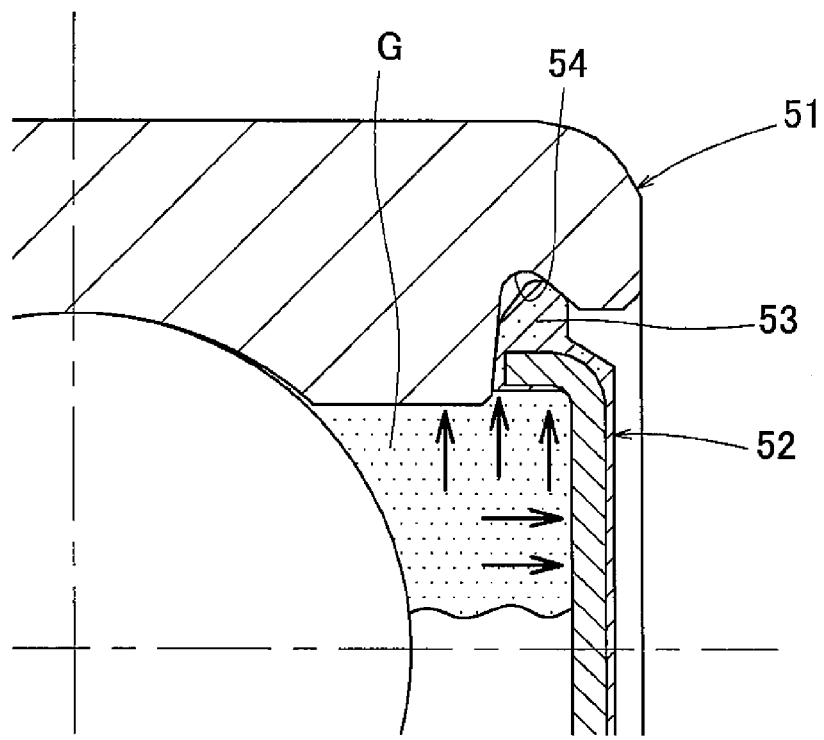
FIG. 6(a) and FIG. 6(b) are enlarged sectional views each illustrating the structure of a seal mounting portion of a conventional outer race rotation bearing.
Figure 6B:
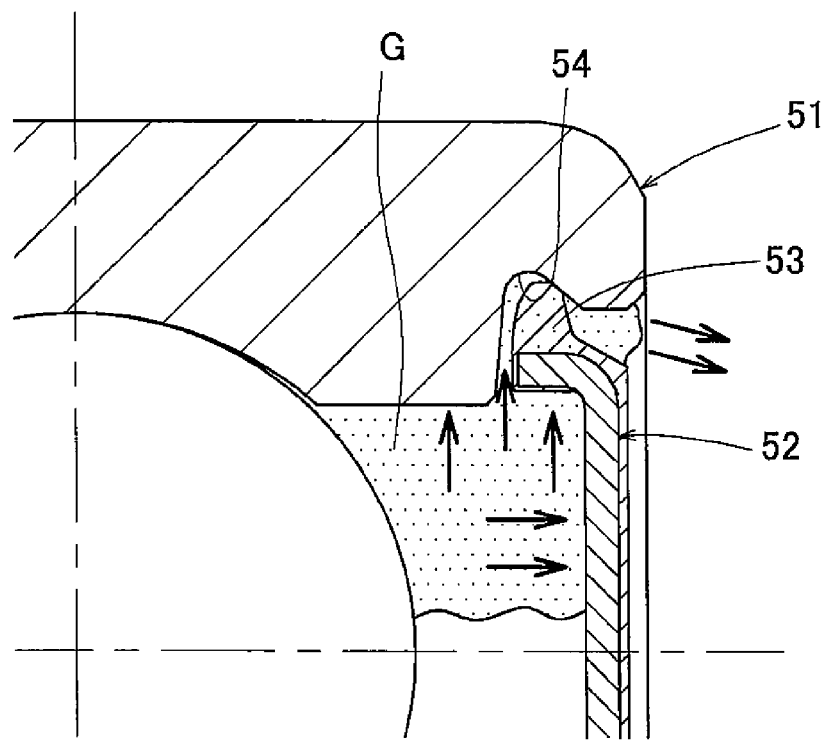

FIG. 5 illustrates another variation in which the inner walls of the annular grooves 7 of the outer race 2 are knurled. In this variation, since the frictional force between the knurled portions 15 of the annular grooves 7 of the outer race 2 and the corresponding mounting portions 9 of the seals 6 is made large, the outer race 2 and the seals 6 do not rotate relative to each other. As a result thereof, it is also possible to prevent grease leakage which arises from the wear of the mounting portions 9.

The present invention is not limited to a pulley bearing for use in the engine of automobiles, as described in the embodiments, but can be equally effectively applied to any other outer race rotation bearing, of which the outer race is rotated at a high speed.

The invention claimed is:

1. An outer race rotation bearing for an engine pulley, said outer race rotation bearing comprising:
   an inner race which is stationary;
   an outer race which is rotatable;
   a plurality of rolling elements arranged between the inner race and the outer race, wherein an annular space is defined between the inner race and the outer race; and
   a pair of seals which close respective axial ends of the annular space;
   the seals each including a metal core and an annular mounting portion encasing a radially outer end of the metal core, the annular mounting portion being formed of a rubber elastic member and fitted in a respective annular groove formed in an inner peripheral surface of the outer race in such a manner that the annular mounting portion maintains the radially outer end of the metal core out of contact with the outer race;
   wherein the elastic member has an axially inward surface opposing an axially inward surface of the annular groove;
   wherein a lubricant is sealed in the annular space;
   wherein a radially inward edge of the elastic member of each of the seals is provided with an elastic lip configured to protrude toward an interior of the bearing when the elastic lip is in an unbiased state such that, if the axially inward surface of the elastic member is separated from the axially inward surface of the annular groove, the elastic lip of each of the seals remains in contact with a groove edge portion at a radially inward edge of the annular groove, the elastic lip of each of the seals being configured such that a ratio of a radial thickness T of the elastic lip to an axial height H of the elastic lip is less than or equal to 1 and greater than or equal to ½;
   wherein the annular groove has an axial inner edge portion and an axial outer edge portion connected by a bottom, the groove edge portion being the axial inner edge portion and having a circular arc cross-section, wherein the groove edge portion is entirely covered by the elastic lip of the elastic member;
   wherein the metal core of each of the seals has a protruding portion protruding radially outwardly beyond the groove edge portion, the protruding portion having a radial length larger than half a radial distance between the groove edge portion and the bottom of the annular groove; and
   wherein the elastic member of each of the seals has a seal lip in sliding contact with the inner race.

2. The outer race rotation bearing according to claim 1, wherein each of the seals has the metal core formed integral with the mounting portion, and wherein the metal core includes an axially extending portion having an axially inner edge and an axially outer edge, the protruding portion of the metal core extending radially outwardly from the axially inner edge of the axial extending portion, and another radial portion of the metal core extending radially inwardly from the axially outer edge.

3. The outer race rotation bearing according to claim 2, wherein inner walls of the annular grooves of the outer race are knurled.

4. The outer race rotation bearing according to claim 1, wherein inner walls of the annular grooves of the outer race are knurled.

5. The outer race rotation bearing according to claim 1, wherein the metal core has a main radial portion and an oblique portion extending axially-inward from a radially outer edge of the main radial portion at an oblique angle relative to both the radial direction and the axial direction, the oblique portion extending into the annular groove of the outer race and being encased within the annular mounting portion.

6. The outer race rotation bearing according to claim 1, wherein the elastic member is fitted in the annular groove such that the elastic member is in contact with an axially outer portion of an inner surface of the annular groove;
   wherein the annular mounting portion of each of the seals is provided with the elastic lip protruding axially inwardly toward the interior of the bearing; and
   wherein the elastic lip of the annular mounting portion of each of the seals has a distal end located axially inward of the groove edge portion.

* * * * *